United States Patent
Gonyer et al.

(10) Patent No.: US 9,516,822 B2
(45) Date of Patent: Dec. 13, 2016

(54) MODULAR AUTOMATED AEROPONIC GROWTH SYSTEM

(71) Applicants: Daegan Gonyer, Madrid, NY (US); Shaun Jones, Colton, NY (US)

(72) Inventors: Daegan Gonyer, Madrid, NY (US); Shaun Jones, Colton, NY (US)

( * ) Notice: Subject to any disclaimer, the term of this patent is extended or adjusted under 35 U.S.C. 154(b) by 132 days.

(21) Appl. No.: 14/090,869

(22) Filed: Nov. 26, 2013

(65) Prior Publication Data
US 2014/0144078 A1 May 29, 2014

Related U.S. Application Data

(60) Provisional application No. 61/729,754, filed on Nov. 26, 2012.

(51) Int. Cl.
*A01G 31/02* (2006.01)

(52) U.S. Cl.
CPC .............. *A01G 31/02* (2013.01); *Y02P 60/216* (2015.11)

(58) Field of Classification Search
CPC ........ A01G 31/00; A01G 31/02; A01G 31/06; A01G 2031/006; A01G 9/022; A01G 27/003; A01G 27/005; A01G 27/006; A01G 9/14; A01G 9/24
USPC .............. 47/62 A, 62 N, 63, 62 R, 59 R, 60, 1.01 R,47/65.5, 66.6, 79, 48.5
See application file for complete search history.

(56) References Cited

U.S. PATENT DOCUMENTS

| | | | | |
|---|---|---|---|---|
| 3,053,011 A * | 9/1962 | Silverman | .............. | A01G 31/06 47/32 |
| 4,332,105 A * | 6/1982 | Nir | .......................... | A01G 31/02 137/563 |
| 4,937,969 A * | 7/1990 | Kawabe | .................. | A01G 31/02 135/94 |
| 5,394,647 A * | 3/1995 | Blackford, Jr. | ......... | A01G 31/02 47/59 R |
| 5,771,634 A * | 6/1998 | Fudger | .................... | G05D 27/02 47/59 R |
| 6,233,870 B1 * | 5/2001 | Horibata | ................. | A01G 31/02 47/59 R |
| 2008/0229661 A1* | 9/2008 | Brooke | ................... | A01G 31/02 47/62 R |
| 2009/0007486 A1* | 1/2009 | Corradi | .................. | A01G 31/02 47/62 R |
| 2009/0126269 A1* | 5/2009 | Wilson | .................... | A01G 31/00 47/62 R |
| 2009/0223128 A1* | 9/2009 | Kuschak | ................. | A01G 31/00 47/62 N |

* cited by examiner

*Primary Examiner* — Trinh Nguyen
(74) *Attorney, Agent, or Firm* — Woods Oviatt Gilman LLP; Dennis B. Danella, Esq.

(57) ABSTRACT

An aeroponic growth system comprising a plurality of modular aeroponic units each including at least one spray nozzle directed into a root zone; a lighting system associated with the plurality of the modular units and configured for emitting light in a vegetative zone; a pressurized reservoir configured for housing a nutrient containing fluid; and a nutrient feeding system configured for fluidly and selectively connecting each of the modular units to the pressurized reservoir in parallel, wherein the nutrient feeding system includes a pressure stop valve associated with each of the modular units. When one of the modular units are disconnected to the associated pressure stop valve, the pressure stop valve is configured for preventing the fluid from flowing from the pressurized reservoir through the pressure stop valve, and the other modular units connected to the nutrient feeding system remain fluidly connected to the pressure reservoir.

36 Claims, 9 Drawing Sheets

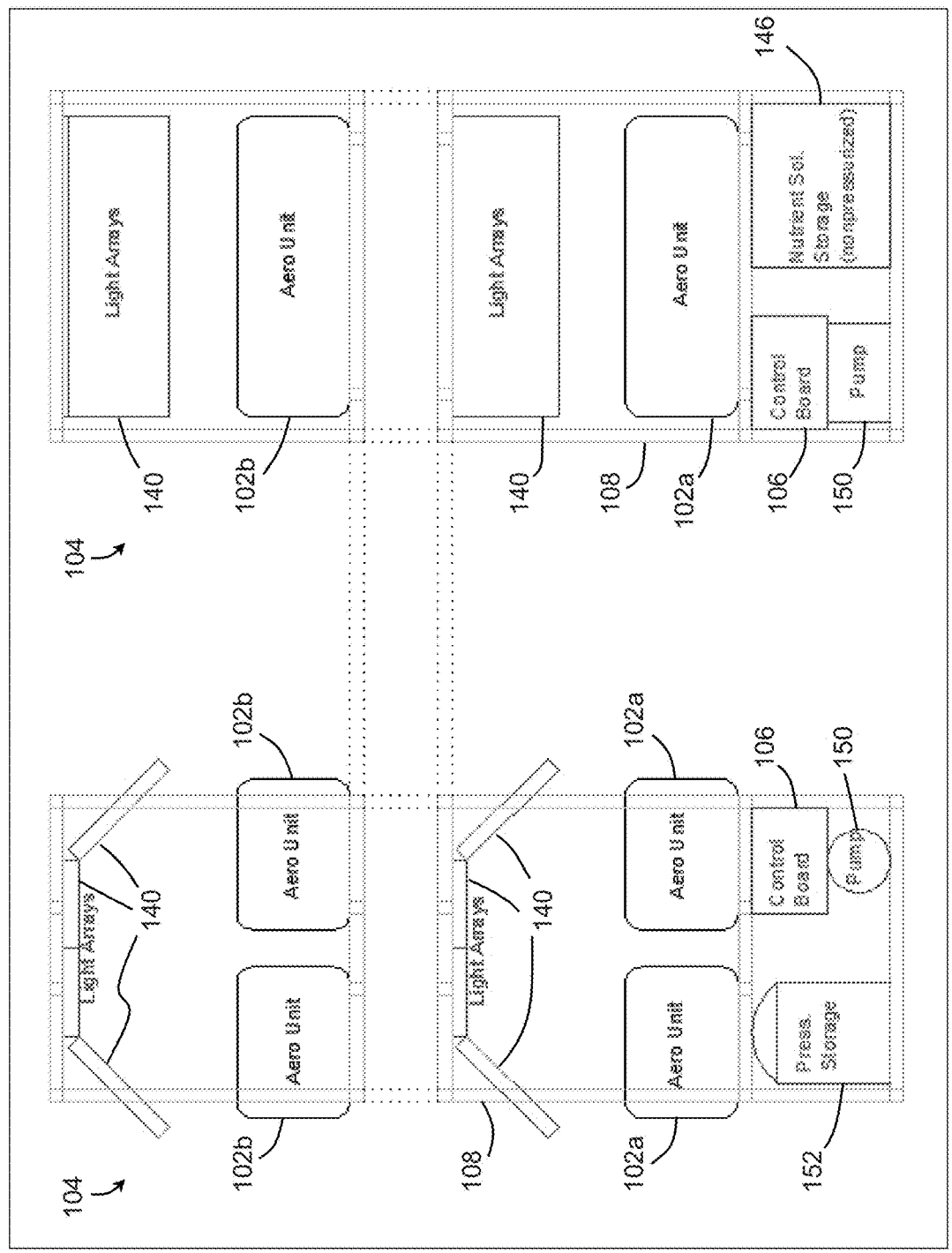

MODULAR AUTOMATED AEROPONIC GROWTH SYSTEM

CROSS-REFERENCE TO RELATED APPLICATIONS

This application claims the benefit of U.S. Patent Application No. 61/729,754, filed Nov. 26, 2012, which is hereby incorporated by reference in its entirety.

STATEMENT REGARDING FEDERALLY SPONSORED RESEARCH OR DEVELOPMENT

This invention was made with government support under Contract Number SU-8347570 awarded by the Environmental Protection Agency. The government has certain rights in the invention.

FIELD OF THE INVENTION

The present patent application is directed to a modular automated aeroponic growth system for growing different types of plants; in particular the system includes a plurality of modular aeroponic units that are fluidly connected to a pressurized nutrient source in parallel and configured to be easily removed and added to provide a scalable plug and play growth system. The system may also utilize certain nozzle spacing, spray direction and cone angles to reduce variation in the growth of plants by minimizing dry and wet root areas, as well as minimizing the loss of nutrients. The system further provides for automated control and monitoring to customize the nutrient delivery, lighting and ambient conditions to increase the effectiveness of the system.

BACKGROUND OF THE INVENTION

Aeroponics is a process of growing plants using air as the growth medium. In an aeroponic system, the plant is suspended such that its stems, leaves and any fruit grow in a vegetative zone above the suspension medium. The roots dangle below the suspension medium in an area commonly referred to as a root zone. The dangling roots receive water and other nutrients through an atomized spray of nutrient-laden water commonly referred to as "nutrient tea."

Aeroponics has been known in the art for decades and is generally either a low pressure system or a high pressure system. High pressure aeroponic systems offer numerous benefits over low pressure systems such that high pressure systems are nearly exclusively utilized within large commercial systems. Additionally, as the price and availability of system components have become more amenable to hobbyists, high pressure systems have increasingly become adopted by home gardeners.

In operation, high pressure aeroponic systems pressurize the nutrient tea and spray it through an atomizer or mister that aerosolizes the tea directly onto the root zone. In this manner, aeroponics offers significant advantages over hydroponics (which utilizes a liquid growing medium) and geoponics (which uses soil or other aggregate material as a growing medium). Specifically, by having the roots suspended within air, aeroponic systems increase the availability to oxygen ($O_2$) and carbon dioxide ($CO_2$) to the plant roots. Both atmospheric gases are vital to plant growth such that aeroponically grown plants grow faster and healthier than other systems.

While aeroponic systems provide numerous benefits over other growing systems, there still exist drawbacks with current aeroponic systems. Among these issues is poor crop reliability. Specifically, present aeroponic systems utilize spray systems which provide water droplets either from the bottom up or from the side wall of the aeroponic container. The spray pattern of the misters may be interfered with and degraded by the growing root mass. That is, current systems utilize atomizers or other misters which inefficiently spray the nutrient tea such that the root zone experiences regions of "wet" and "dry" zones. Wet zones receive too much nutrient tea such that gas exchange ($O_2$ and/or $CO_2$) is hindered, while dry zones do not receive sufficient nutrient tea (if any at all) such that nutrient uptake by the roots is inadequate. In either case, wet zones and dry zones negatively affect plant growth and fruit production.

A further deficiency in the art is the inability to efficiently add, remove, modify or otherwise manipulate a modular aeroponic growing system. While current systems known in the art have been designed to be expanded, this expansion is highly cumbersome and directly impacts plant growth and productivity. High pressure aeroponic systems deliver nutrient tea through atomizers or other misters operating at pressures in excess of 75-80 psi. Currently available aeroponic systems require operators to turn off the pressure system to the entire system when expanding or otherwise manipulating or repairing a single aeroponic unit or individual component thereof (i.e., replacing a clogged atomizer). Indeed, some systems even require re-priming of the pump(s) before the pressure system is brought back online.

Finally, present aeroponic systems employ control systems that are not integrated for central control. These systems often contain analog controllers. Thus, the availability for process automation, automatic system error detections (e.g., insufficient spray pressure, individual atomizer malfunction, etc.) is not possible with currently available systems.

Accordingly, what is needed is a "plug-and-play" system which allows for efficient maintenance and/or expansion of individual units within the system without interrupting or otherwise disturbing the operation of other individual aeroponic units. What is further needed is an aeroponic system having atomizers/misters and unit constructions which minimize the occurrence of wet or dry zones within the root zone. What is further needed is an automated digital control system that runs preprogrammed spray operations; monitors and controls the temperature, humidity (i.e., activation of the misters), $CO_2$ levels, light quality, light intensity, and other suitable plant growth parameters; and initiates alarms in the event of high or low sensor readings, pump failure, pressure loss, water loss, power failure or the occurrence of any other monitored process variable. The present invention fulfills these and other needs.

SUMMARY OF THE INVENTION

In accordance with one aspect, to address the above-referenced drawbacks of the existing art, the present invention provides an aeroponic growth system for growing vegetation, the system comprising a plurality of modular aeroponic units configured for supporting the vegetation, wherein each of the plurality of modular aeroponic units define a root zone and a vegetative zone, and wherein each of the plurality of modular aeroponic units include at least one spray nozzle directed into the root zone. The system further includes a lighting system associated with the plurality of the modular aeroponic units and configured for emitting light in the vegetative zone. The lighting system may include a plurality of lighting units, wherein each of the plurality of modular aeroponic units are associated with one of the plurality of lighting units. A pressurized reservoir is configured for housing a fluid containing one or more nutrients. A nutrient feeding system is configured for fluidly and selectively connecting each of the plurality of modular aeroponic units to the pressurized reservoir in parallel, wherein the nutrient feeding system includes a pressure stop valve associated with each of the plurality of modular aeroponic units. When one or more of the plurality of modular aeroponic units are connected to an associated pressure stop valve, the nutrient feeding system directs the fluid to the at least one spray nozzle associated with the modular aeroponic unit from the pressurized reservoir. When one or more of the plurality of modular aeroponic units are disconnected to the associated pressure stop valve, the pressure stop valve is configured for preventing the fluid from flowing from the pressurized reservoir through the pressure stop valve, and the other modular aeroponic units connected to the nutrient feeding system remain fluidly connected to the pressure reservoir.

The system may also include an unpressurized reservoir for storing the fluid, and a pump that is in fluid communication between the unpressurized reservoir and the pressurized reservoir, wherein the pump is configured for drawing the fluid from the unpressurized reservoir into the pressurized reservoir and pressurizing the fluid in the pressurized reservoir. Further, a filter is in fluid communication between the unpressurized reservoir and the pump. A spray valve may be in fluid communication between the pressurized reservoir and each of the plurality of modular aeroponic units, wherein the spray valve is configured for selectively allowing the fluid to flow from the pressurized reservoir to the associated modular aeroponic unit.

The system may further include a system controller in communication with the spray valve, wherein the system controller is configured for selectively adjusting the spray valve to control the amount of fluid that is provided to the associated modular aeroponic units through the nutrient feeding system. Each of the plurality of lighting units may be controlled independently by the system controller. Further, the system controller is configured to selectively control the duration and intensity of light emitted by each of the plurality of lighting units. One or more sensors may be in communication with the system controller to collect data related to system. A display may be provided for displaying the data collected from the one or more sensors, wherein the one or more sensors include a light sensor, an environmental sensor, and/or a nutrient solution sensor. The data collected from the one or more sensors may be stored in a memory, wherein the memory is in communication with the system controller through a network.

At least one remote computing device may be in communication with the system controller through a network, wherein the at least one remote computing device includes a software application program that is configured for displaying the data collected by the system controller, independently controlling the plurality of lighting units, and selectively allowing the fluid to flow from the pressurized reservoir to the plurality of modular aeroponic units.

In another aspect of the present invention, each of the plurality of modular aeroponic units includes a top wall, a bottom wall, and a side wall extending between the top wall and the bottom wall, wherein the top wall, the bottom wall, and the side wall define the root zone, and wherein a portion of the side wall is disposed at an angle of between about 95 degrees and about 105 degrees, preferably about 101 degrees, relative to the top wall, wherein the portion of the side wall provides support for the at least one spray nozzle.

Further, at least one spray nozzle includes a cone angle of about 90 degrees to about 130 degrees, preferably about 110 degrees. Moreover, the at least one spray nozzle includes a plurality of spray nozzles, wherein each of the plurality of spray nozzles are spaced apart about 6 inches from one another.

BRIEF DESCRIPTION OF THE DRAWINGS

The accompanying drawings form a part of this specification and are to be read in conjunction therewith, wherein like reference numerals are employed to indicate like parts in the various views, and wherein:

FIG. 2 is a schematic front view drawing of a group of stacked modular aeroponic units;

FIG. 3 is a schematic side view drawing of the group of stacked modular aeroponic units shown in FIG. 2;

DETAILED DESCRIPTION OF THE INVENTION

In general, the present invention provides a modular "plug-and-play" aeroponic growth system which allows for efficient maintenance and/or expansion of individual modular aeroponic units within the system without interrupting or otherwise disturbing the operation of other individual modular aeroponic units. The present system also configures the positioning and cone angles of the atomizers/misters (referred to herein as "spray nozzles") and the structure of the modular aeroponic units to minimize the occurrence of wet or dry zones within a root zone. The present system also provides an automated system controller that may implement preprogrammed spray operations, monitor and control the temperature, humidity (i.e., activation of the spray nozzles), $CO_2$ levels, light quality, light intensity, and other suitable plant growth parameters, and initiate alarms in the event of high or low sensor readings, pump failure, pressure loss, water loss, power failure or the occurrence of any other monitored process variable. It will be understood that the components and methods described herein for providing a modular automated aeroponic growth system for plants may be implemented in hardware, software or a combination thereof.

Figure 1:
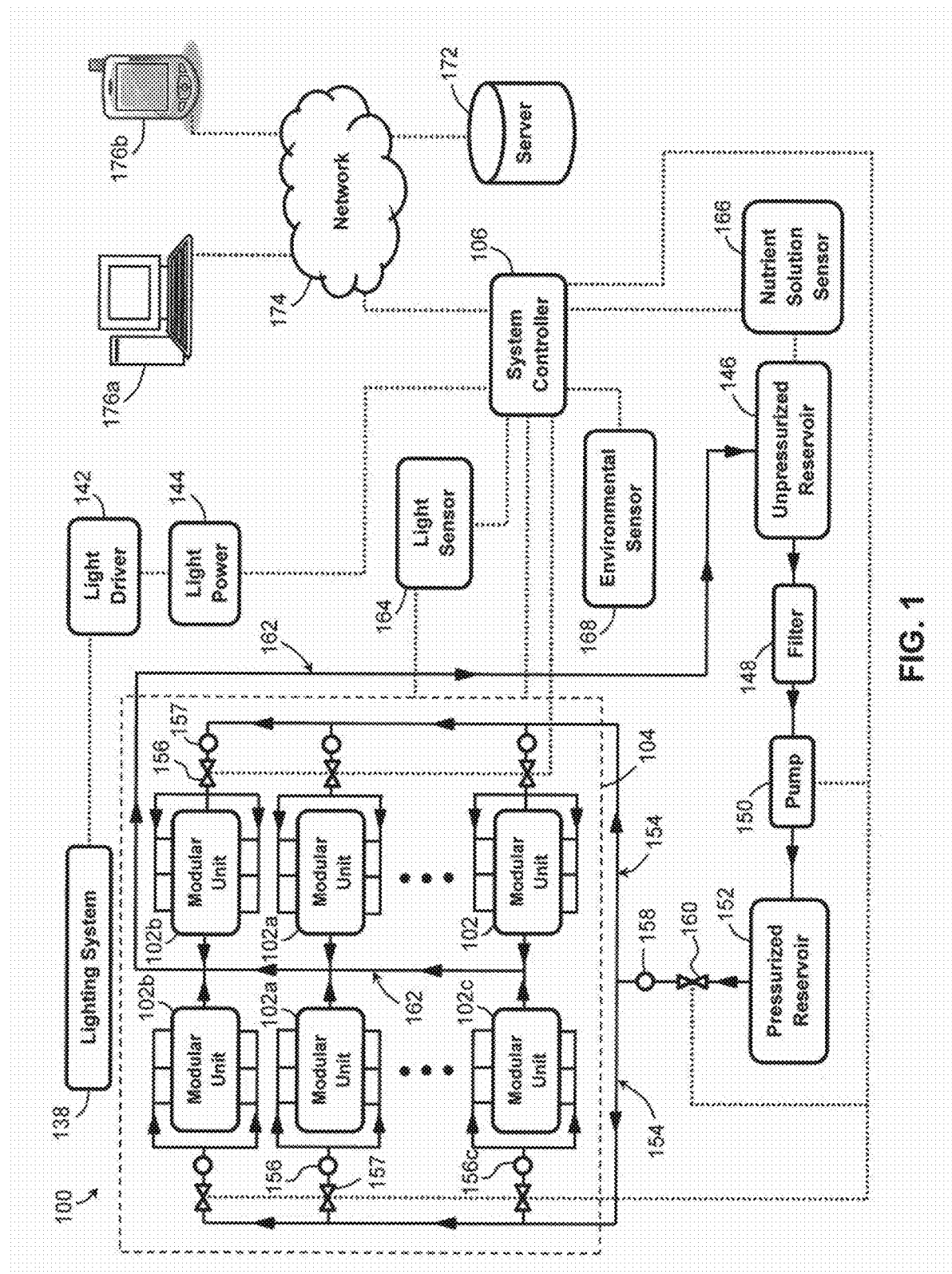
FIG. 1 is a schematic drawing of a modular automated aeroponic growth system in accordance with the present invention.
Figure 4:
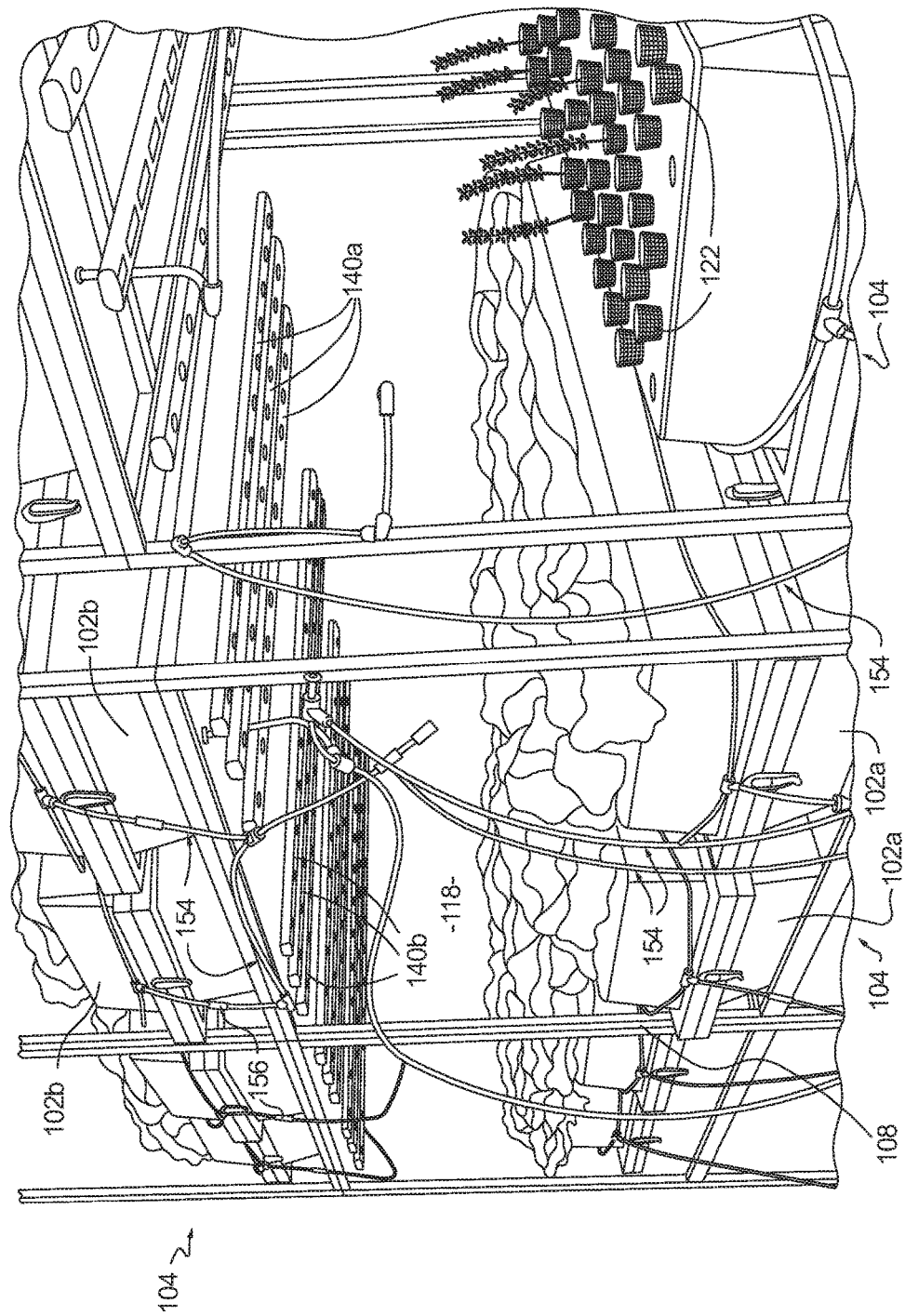
FIG. 4 is a picture of a plurality of groups of modular aeroponic units.
Figure 5:
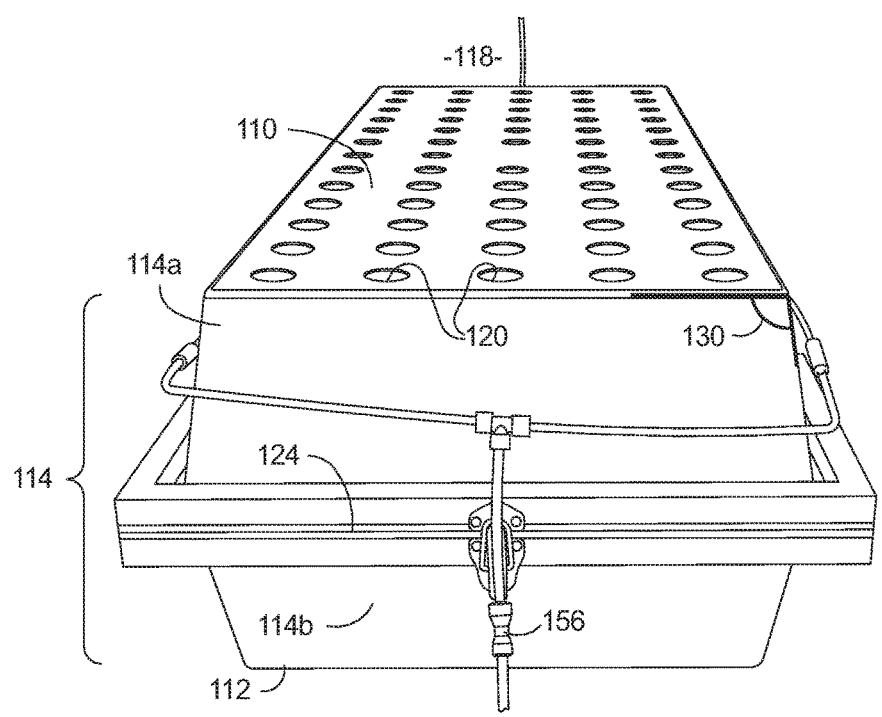
FIG. 5 is a picture showing a front view of a modular aeroponic unit.

Referring to the drawings in detail, and specifically to FIG. 1, a modular automated aeroponic growth system according to one aspect of the present invention is generally designated as reference numeral 100. System 100 includes a plurality of modular aeroponic units 102 (hereinafter "modular units") configured for supporting vegetation growth. Modular units 102 may be arranged or stacked to form a group 104, wherein each group 104 may include two or more modular units 102. For example, as best seen in FIGS. 2-4, system 100 may include a group 104 including two modular units 102a positioned next to one another on a bottom shelf of a metal rack 108, and two modular units 102b positioned next to one another on a top shelf of metal rack 108. It will be understood that system 100 may include one or more groups 104 that are in communication with a system controller 106, as seen in FIG. 4. System controller 106 is configured to control and/or monitor the one or more groups 104 as a whole, or each of the modular units 102 on an individual basis. The control and monitoring of modular units 102 by system controller 106 will be described in more detail below.

As best seen in FIGS. 5-8, each modular unit 102 includes a top wall 110, a bottom wall 112, and a side wall 114 extending between top wall 110 and bottom wall 112. The combination of top wall 110, bottom wall 112, and side wall 114 define a root zone 116 within modular unit 102 that is configured to house the roots of a plant that is supported by modular unit 102. The area outside modular unit 102, particularly above top wall 110, is designated as a vegetative zone 118 and is used to accommodate the vegetative portion of the plant. The root zone 116 is isolated from vegetative zone 118 to eliminate nutrient spray on the vegetative zone. Top wall 110 may have a plurality of apertures 120 formed therein configured for receiving and supporting the plant in the proper position with respect to modular unit 102. A vegetation holder 122 (FIG. 4) may be used to assist with supporting plant in aperture 120.

In one exemplary embodiment, side wall 114 may be split into two parts 114a, 114b wherein one portion of the side wall 114a extends upwardly from a parting line 124 toward top wall 110, and the other portion of the side wall 114b extends downwardly from the part line 124 toward bottom wall 112. Side walls 114a, 114b may be secured to one another by one or more fastening mechanisms 126 with a gasket 128 positioned therebetween to seal the two halves. In another example, modular unit 102 does not include side wall 114a, and top wall 110 extends straight across forming the top half of modular unit 102. In either case, in one aspect of the present invention, at least a nozzle support portion of side wall 114 is disposed at an angle of between about 95 degrees and about 105 degrees relative to top wall 110, and preferably about 101 degrees relative to top wall 110.

Figure 6:
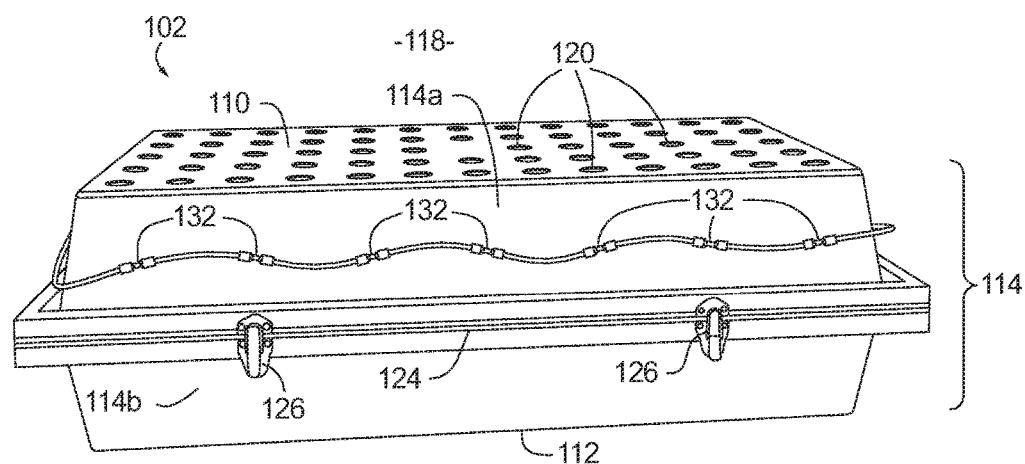
FIG. 6 is a picture showing a side view of the modular aeroponic unit shown in FIG. 5.
Figure 7:
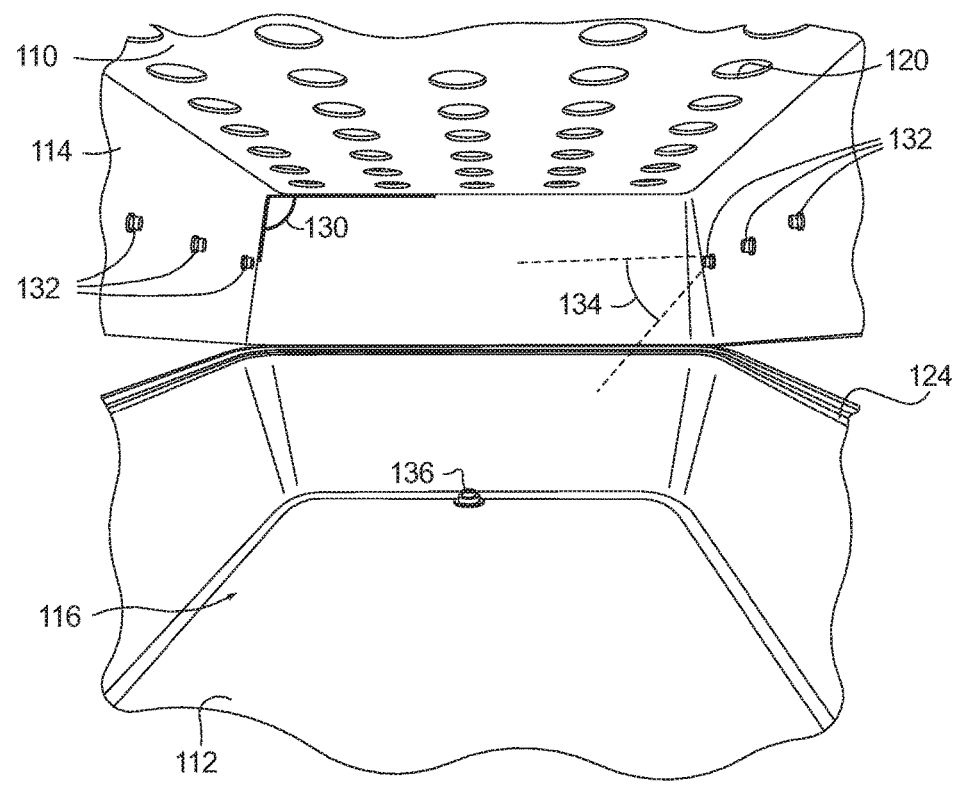
FIG. 7 is a picture showing the inside of the modular aeroponic unit shown in FIG. 5.
Figure 8:
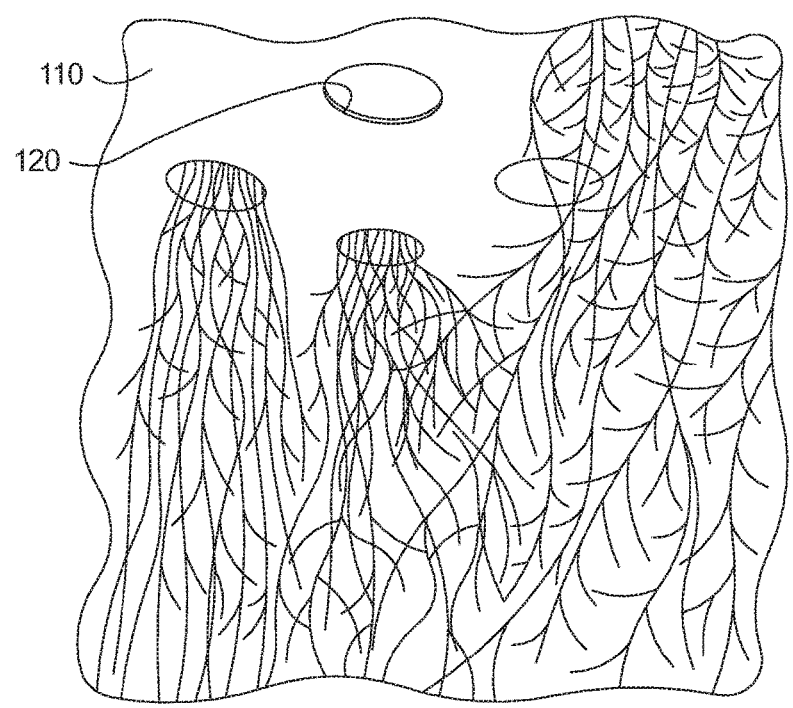
FIG. 8 is a picture showing the inside surface of the top wall of the modular aeroponic unit shown in FIG. 5.

As best seen in FIGS. 6 and 7, the nozzle support portion of side wall 114 is configured for providing mounting locations for a plurality of spray nozzles 132, wherein spray nozzles 132 are directed into root zone 116. When the fluid mist is emitted from spray nozzle 132, the mist forms a cone pattern with the apex at the orifice formed in spray nozzle 132, and spreading outwardly therefrom. A cone angle is the angle from quadrant to apex to opposing quadrant (i.e., the side view of the cone looks like "<" and the cone angle is the angle between the two lines. In another aspect of the present invention, at least one of spray nozzles 132 includes a cone angle 134 of about 90 degrees to about 130 degrees, and preferably about 110 degrees. Further, spray nozzles 132 may be mounted within nozzle support locations about 6 inches from one another. The combination of the side wall angle, cone angle of spray nozzles, and the spacing of the spray nozzles provide an equilateral coverage of the spray pattern throughout root zone 116. As best seen in FIG. 7, modular unit 102 further includes an outlet 136 defined in bottom wall 112, which allows unused or residual fluid sprayed by spray nozzles 132 (not absorbed by the vegetation roots) to be removed from modular unit 110 using a gravity siphon or a pump.

The angle 130 of the side walls 114 in conjunction with cone angle 134 and relative placement of spray nozzles 132 dictate a number of things. One aspect it dictates is the direct water loss of system 100 by limiting the over spray (i.e., the nutrient mist that leaves system 100 through apertures 120 in top wall 110), which then hits the plant leaves and causes adverse health effects on the plants, as well as general fluid and nutrient depletion of system 100. This can be limited by using vegetation holder 122 that seals apertures 120, but system 100 is often used with mesh or other supports that do not seal apertures 120. By properly controlling side wall 114 and spray cone angles 134, the amount of mist being lost in this fashion can be reduced without other adverse effects in spray pattern (e.g., dry spots, penetration). These two angles 130, 134 with nozzle spacing also dictate the volume coverage of the spray pattern in root zone 116 of modular unit 102. Making the spray pattern as even as possible reduces variation in the growth of plants placed in different locations in modular unit 102, and eliminates dry spots as well as wet spots (i.e., areas that receive excessive watering as a result of location). The side wall angle 130 dictates the primary angle of the spray pattern from the nozzle (centering in a pattern angled downward from horizontal the same angle as the side wall angle from vertical), which contributes to the ability of the spray cone to penetrate root zones. This also contributes to even coverage in the dense root zones of mature plants.

With reference to FIG. 1, system 100 further includes a lighting system 138 associated with modular units 102 and configured for emitting light in vegetative zone 118. In one embodiment, lighting system 138 may include a plurality of lighting units 140a, 140b (FIGS. 2-4), wherein each of modular units 102 is associated with a separate lighting unit 140a, 140b. Further, it should be understood that each lighting unit 140a, 140b may include one or more light arrays as seen in FIG. 4. Lighting units 140 may be driven by a light driver 142 and powered by a power source 144. Light driver 142 may drive a plurality of lighting units 140 or each lighting unit 140 independent of one another. The lighting arrays that form lighting units 140 may have a flat orientation (FIG. 4) or an angled orientation (FIG. 2). Further, lighting units 140 may include light emitting diodes (LED) or a fluorescent light source. Lighting units 140 may be, for example, the Eclipse F1 or F6 distributed by Illumitex, Austin, Tex.

Figure 9:
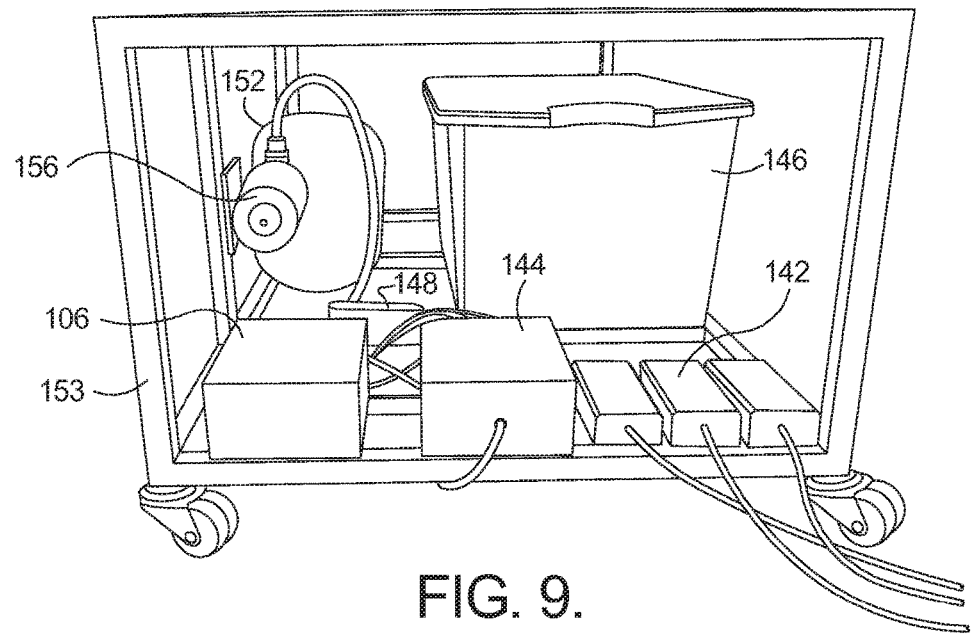
FIG. 9 is a picture showing a side view of various components used in the system.
Figure 10:
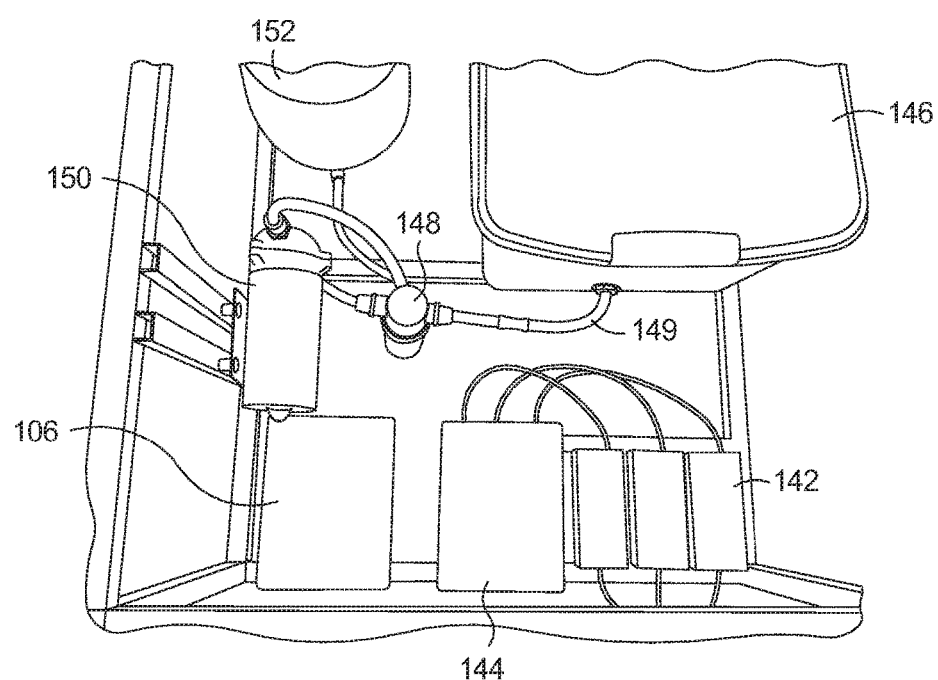
FIG. 10 is a picture showing a top view of the components shown in FIG. 9.

As best seen in FIGS. 1, 9 and 10, system 100 further comprises an unpressurized reservoir 146 configured for storing a fluid, such as, for example, water, containing one or more nutrients ("nutrient tea"). It will be understood that nutrients may be added to the water, for example, after unpressurized reservoir 146 is filled with water. A filter 148 is in fluid communication and downstream of unpressurized reservoir 146. Filter 148 and unpressurized reservoir may have a quick disconnect pressure stop 149 disposed therebetween. Filter 148 is configured for removing any undesirable impurities contained in the fluid. For example, filter 148 may be a Raw Water Strainer 4477881 distributed by West Marine, Watsonville, Calif. A pump 150 is in fluid communication and downstream of filter 148, and is configured for drawing the nutrient fluid from unpressurized reservoir 146, through filter 148, and into a pressurized reservoir 152 to fill pressurized reservoir 152 to about 100 psi, for example. As such, pressurized reservoir 152 houses the fluid containing one or more nutrients until distributed to modular units 102. Pump 150 may be controlled by a pressure shut off or a timer dictated by the number of modular units 102 in group 104. A support frame 153 may be used as a mounting location or support for the above-referenced components.

As best seen in FIG. 1, and in accordance with another aspect of the present invention, system 100 further includes a nutrient feeding system 154 configured for fluidly and selectively connecting each of modular units 102 to pressurized reservoir 152 in parallel. With additional reference to FIG. 4, nutrient feeding system 154 may include a series of interconnecting tubes that are configured to allow the fluid to pass therethrough. Further, nutrient feeding system 154 may include a pressure stop quick connect valve 156 and a spray valve 157 associated with each of modular units 102. Spray valve 157 variably controls the amount of fluid that flows to spray nozzles 132 of the associated modular unit 102. When modular unit 102 is connected to an associated pressure stop valve 156, nutrient feeding system 154 directs the fluid through spray valve 157 to spray nozzles 132 associated with modular unit 102 from pressurized reservoir 152. If, for example, a modular unit 102c is disconnected to an associated pressure stop valve 156c, pressure stop valve 156c is configured for preventing the fluid from flowing from pressurized reservoir 156 through pressure stop valve 156c, wherein the other modular units 102 that are connected to nutrient feeding system 154 will remain fluidly connected to pressurized reservoir 156 to feed their respective spray nozzles 132. In other words, a modular unit 102c may be removed from system 100 without interrupting or otherwise disturbing the operation of other modular units 102 that remain connected to pressurized reservoir 156. Likewise, additional modular units 102 may be added to system 100 without interrupting modular units 102 already connected to pressurized reservoir 156.

System 100 may further include a primary pressure stop valve 158 associated with pressurized reservoir 156 to allow an entire group 104 of modular units 102 to be taken off-line, if necessary. Further, a primary valve 160 may be in fluid communication between pressurized reservoir 156 and modular units 102, wherein primary valve 160 is configured for selectively allowing and disallowing the fluid to flow from pressurized reservoir 156 to spray nozzles 132 in modular units 102. Primary valve 160 may also be configured for incrementally varying the amount of the fluid flowing from pressurized reservoir 156 to spray nozzles 132. Primary valve 160 may be any automated valve or solenoid.

System 100 may also include a fluid return system 162 that operates to return the unused or residual fluid from modular units 102 to unpressurized reservoir 146. For example, fluid return system 162 may include tubing that fluidly connects outlets 136 of modular units 102 with unpressurized reservoir 146. As mentioned above, the fluid may be fed to unpressurized reservoir 146 using a gravity siphon or a pump.

As best seen in FIG. 1, system 100 may include a plurality of sensors for collecting data from certain system components to provide information regarding the efficiency and operation of system 100. For example, separate light sensors 164 may be associated with each of modular units 102 to detect and collect data related to the light quality in terms of photo-synthetically active radiation (PAR) and intensity of the ambient light. In the alternative, a light sensor 164 may be associated with more than one modular unit 102 depending on the specificity of monitoring desired. A nutrient solution sensor 166 may be associated with unpressurized reservoir 146 and configured for detecting the temperature, pH, electro-conductivity, and nutrient levels of the fluid contained within unpressurized reservoir 146. Further, an environmental sensor 168 may be included to collect ambient data within the area that the modular units 102 are located in, such as, but not limited to, temperature, humidity, $CO_2$, electricity, light quality, and light intensity. It should be understood that the data collected from each of the above-referenced sensors may be by a wired or wireless connection.

In accordance with another aspect, the present invention includes a system controller 106 that is configured to collect, monitor, and store data collected from each of sensors 164, 166, 168. It should be understood that sensors 164, 166, 168 may transmit data to system controller 106 using a wired or wireless connection. The data collected from sensors 164, 166, 168 may be stored real-time in a local memory or remotely on a server 172 via a network 174, such as, for example, the Internet. The stored data may be displayed on a display of system controller 106 to monitor and analyze system 100 real-time or for a given time period using a web-based query system. GUI query based reports may also be generated using the collected data. It should be understood that system controller 106 may operate one or more groups 104 in tandem or independently.

Further, system controller 106 allows separate slave systems to be plugged in and associated with each of modular units 102 that are electronically identified via a wired or wireless connection. A slave system is used in conjunction with system controller 106 to control any parameter or function associated with the corresponding module unit. Once identified by system controller 106, a control module allows each slave system to be controlled separately by system controller 106. In other words, any slave system can be connected to system controller 106, and system controller 106 may control the lighting, spray duration, spray interval, automatically and individualized for each slave system. For example, system controller 106 may be in communication with spray valves 157 associated with each modular unit 102, wherein system controller 106 is configured for selectively adjusting each of spray valves 157 to control the amount of fluid that is provided to each modular unit 102 through nutrient feeding system 154. Therefore system controller 106 may implement custom preprogrammed spray operations for each modular unit 102 based on data collected from sensors 164, 166, 168. In another example, system controller 106 is configured for independently controlling the duration and intensity of light emitted by each of the plurality of lighting units 140 associated with its respective modular unit 102 using light driver 142. The independent control of the lighting units 140 may be based on data collected from each light sensor 164. In yet another example, system controller 106 may be configured to control the temperature, humidity, $CO_2$ of the ambient conditions in which the modular units 102 are subjected to based on real-time feedback from environment sensor 168 by, for example, integrating to the HVAC system for the growing facility. Thus, system controller 106 may be used to optimize the fluid flow, lighting and other environmental conditions for specific crops. Modular units 102 and system controller 106 have been developed in tandem to be functional and modular together in a hot swappable, plug and play fashion utilizing pressure stop connections in nutrient feeding system.

System controller 106 may also be configured to initiate and display an alarm on a display in the event of high or low sensor readings, pump failure, pressure loss, water loss, power failure or the occurrence of any other monitored process variable. System controller 106 may also send one or more emergency status messages for each slave system through Short Message Service (SMS), Multimedia Messaging Service (MMS), electronic mail, telephone call or message, or the like, to at least one remote computing device 176a, 176b, wherein an identification of the particular modular unit 102 and sensor that tripped the alarm for troubleshooting are displayed. Active data for each modular unit 102 is cataloged to server 172 to mine for maintenance patterns in order to develop better preventative maintenance. Further, at least one remote computing device 176a, 176b may be in communication with system controller 106 through network 174, wherein at least one remote computing device 176a, 176b includes a software application program module that is configured for displaying the data collected by system controller 106, independently controlling the plurality of lighting units 140, and selectively allowing the fluid to flow from the pressurized reservoir to each modular unit 102 by independently controlling each spray valve 157.

Figure 11:
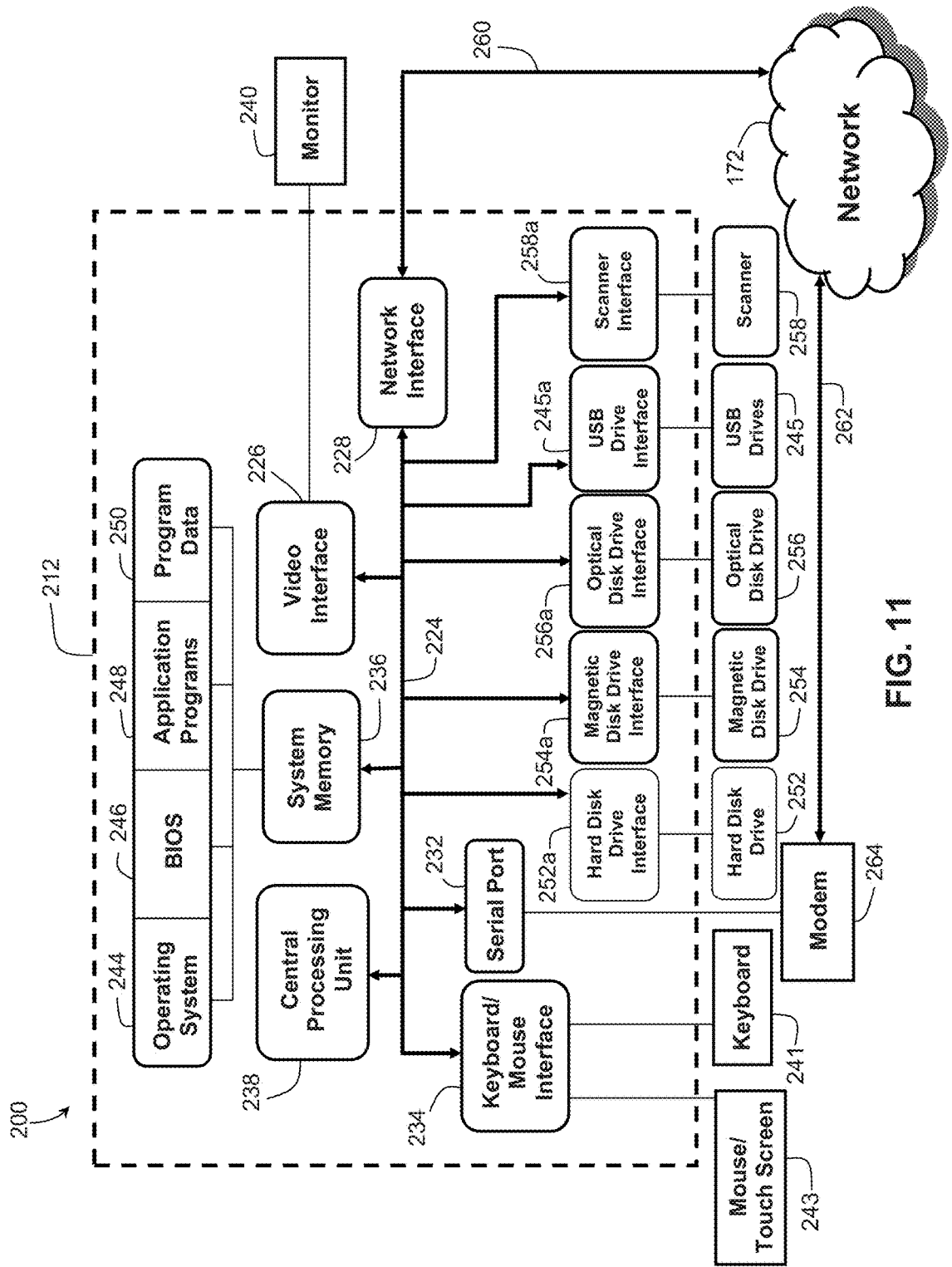
FIG. 11 is a schematic drawing generally illustrating a computing environment in which the invention may be implemented

FIG. 11 shows an exemplary computing environment 200 that can be used to implement any of the processing thus far described with respect to modular automated aeroponic growth system 100. For example, computing environment 200 may be representative of system controller 106, server 172, or remote computing devices 176a, 176b. Computer 212 may be a personal computer including a system bus 224 that couples a video interface 226, network interface 228, one or more serial ports 232, a keyboard/mouse interface 234, and a system memory 236 to a Central Processing Unit (CPU) 238. A monitor or display 240 is connected to bus 224 by video interface 226 and provides the user with a graphical user interface to view the data collected from sensors 164, 166, 168 or generated alarms. The graphical user interface allows the user to enter commands and information into computer 212 using a keyboard 241 and a user interface selection device 243, such as a mouse or other pointing device. Keyboard 241 and user interface selection device are connected to bus 224 through keyboard/mouse interface 234. The display 240 and user interface selection device 243 are used in combination to form the graphical user interface which allows the user to view the collected data from sensors 164, 166, 168 and alarms. Other peripheral devices may be connected to computer through serial port 232 or universal serial bus (USB) drives 245 to transfer information to and from computer 212.

The system memory 236 is also connected to bus 224 and may include read only memory (ROM), random access memory (RAM), an operating system 244, a basic input/output system (BIOS) 246, application programs 248 and program data 250. The computer 212 may further include a hard disk drive 252 for reading from and writing to a hard disk, a magnetic disk drive 254 for reading from and writing to a removable magnetic disk (e.g., floppy disk), and an optical disk drive 256 for reading from and writing to a removable optical disk (e.g., CD ROM or other optical media). The computer 212 may also include USB drives 245 and other types of drives for reading from and writing to flash memory devices (e.g., compact flash, memory stick/PRO and DUO, SD card, multimedia card, smart media xD card), and a scanner 250. A hard disk interface 252a, magnetic disk drive interface 254a, an optical drive interface 256a, a USB drive interface 245a, and a scanner interface 258a operate to connect bus 224 to hard disk drive 252, magnetic disk drive 254, optical disk drive 256, USB drive 245 and a scanner 258, respectively. Each of these drive components and their associated computer-readable media may provide computer 212 with non-volatile storage of computer-readable instruction, program modules, data structures, application programs, an operating system, and other data for the computer 212. In addition, it will be understood that computer 212 may also utilize other types of computer-readable media in addition to those types set forth herein, such as digital video disks, random access memory, read only memory, other types of flash memory cards, magnetic cassettes, and the like.

Computer 212 may operate in a networked environment using logical connections with server 172. Network interface 228 provides a communication path 260 between bus 224 and network 172, which allows for the transmission of data collected from sensors 164, 166, 18 and generated alerts using computer 212. This type of logical network connection is commonly used in conjunction with a local area network (LAN). Sensor data and alerts file may also be communicated from bus 224 through a communication path 262 to network 172 using serial port 232 and a modem 264. Using a modem connection between the computer 212 and network 172 is commonly used in conjunction with a wide area network (WAN). It will be appreciated that the network connections shown herein are merely exemplary, and it is within the scope of the present invention to use other types of network connections using computer 212 including both wired and wireless connections.

In use, unpressurized reservoir 146 is filled with a fluid and nutrients suitable for the plants that will be grown using system 100, and pump 150 is used to draw the fluid through filter 148 and fill the pressurized reservoir 152 to a pressure of 100 psi, for example. System controller 106 may be used to activate pump 150. Primary valve 160 is then selectively and variably opened by system controller 106 to feed the fluid, in parallel, though nutrient feed system 154 to each of the modular units 102 that are connected to a pressure stop valve 156. Each spray valve 157 is variably and independently adjusted by system controller 106 to allow the fluid to pass through to the spray nozzles 132 of the associated modular unit 102. Spray nozzles 132 then atomize or mist the fluid in the root zone 116 to feed the plants supported by modular unit 102. During the process of spraying in root zone 116, lighting units 140 are being controlled by system controller 106 to provide an optimum light duration and intensity. The residual fluid that is not absorbed by the roots collects on bottom wall 112 and is feed out of outlet 136, through fluid return system 162, and back into unpressurized reservoir 152. During this process, system controller 106 collects and stores data from sensors 164, 166, 168 and will generate an alarm, and optionally send the alarm to remote computing devices 176a, 176b, if the collected data falls outside a predetermined range or threshold value.

The system 100 described above has been shown to increase plant density by 8 fold on a 1 to 1 growth area comparison, as well as shorten growth cycles by as much as 25%. As best seen in FIGS. 2-4, modular units 102 may be stacked vertically to obtain higher density per footprint ratios versus traditional farming methods. In one case study, system 100 has shown that it may reduce global warming potential by about 50%, fossil fuel usage by about 95%, nutrient usage by about 82%, and water usage by about 94% in a lifecycle analysis of produce production approach.

From the foregoing, it will be seen that this invention is one well adapted to attain the ends and objects hereinabove set forth together with other advantages which are obvious and which are inherent to the method and apparatus. It will be understood that certain features and sub combinations are of utility and may be employed without reference to other features and sub combinations. This aspect is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions described above and illustrated in the drawings are presented by way of example only and are not intended to limit the concepts and principles of the present invention. As used herein, the terms "having" and/or "including" and other terms of inclusion are terms indicative of inclusion rather than requirement.

While the invention has been described with reference to preferred embodiments, it will be understood by those skilled in the art that various changes may be made and equivalents may be substituted for elements thereof to adapt to particular situations without departing from the scope of the invention. Therefore, it is intended that the invention not be limited to the particular embodiments disclosed as the best mode contemplated for carrying out this invention, but that the invention will include all embodiments falling within the scope and spirit of the appended claims.

What is claimed is:

1. An aeroponic growth system for growing vegetation, the system comprising:
   a plurality of modular aeroponic units configured for supporting vegetation, wherein each of the plurality of modular aeroponic units define a root zone and a vegetative zone, and wherein each of the plurality of modular aeroponic units include at least one spray nozzle directed into the root zone;
   a lighting system associated with the plurality of the modular aeroponic units and configured for emitting light in the vegetative zone;
   a pressurized reservoir configured for housing a fluid containing one or more nutrients; and
   a nutrient feeding system configured for fluidly connecting each of the plurality of modular aeroponic units to the pressurized reservoir in parallel, wherein the nutrient feeding system includes a pressure stop quick connect valve associated with each of the plurality of modular aeroponic units,
   wherein when one or more of the plurality of modular aeroponic units are connected to an associated pressure stop quick connect valve, the nutrient feeding system directs the fluid to the at least one spray nozzle associated with the modular aeroponic unit from the pressurized reservoir, and
   wherein when one or more of the plurality of modular aeroponic units are disconnected from the associated pressure stop quick connect valve, the pressure stop quick connect valve is configured for preventing the fluid from flowing from the pressurized reservoir through the pressure stop quick connect valve, and the other modular aeroponic units connected to the nutrient feeding system remain fluidly connected to the pressure reservoir, wherein each of the plurality of modular aeroponic units includes a top wall, a bottom wall, and a side wall extending between the top wall and the bottom wall, wherein the top wall, the bottom wall, and the side wall define the root zone, wherein a portion of the side wall is disposed at an angle of about 95 degrees to about 105 degrees relative to the top wall, wherein the portion of the side wall provides support for the at least one spray nozzle, and wherein the at least one spray nozzle includes a cone angle of about 90 degrees to about 130 degrees.

2. A system in accordance with claim 1, further comprising:
   an unpressurized reservoir for storing the fluid; and
   a pump that is in fluid communication between the unpressurized reservoir and the pressurized reservoir, wherein the pump is configured for drawing the fluid from the unpressurized reservoir into the pressurized reservoir and pressurizing the fluid in the pressurized reservoir.

3. A system in accordance with claim 1, further comprising a filter in fluid communication between the unpressurized reservoir and the pump.

4. A system in accordance with claim 1, wherein the lighting system includes a plurality of lighting units, wherein each of the plurality of modular aeroponic units are associated with one of the plurality of lighting units.

5. A system in accordance with claim 1, further comprising a plurality of spray valves in fluid communication between the pressurized reservoir and each of the plurality of modular aeroponic units, wherein each of the plurality of spray valves is configured for selectively allowing the fluid to flow from the pressurized reservoir to the associated modular aeroponic unit.

6. A system in accordance with claim 5, further comprising a system controller in communication with the plurality of spray valves, wherein the system controller is configured for independently adjusting the plurality of spray valves to control the amount of fluid that is provided to the associated modular aeroponic units through the nutrient feeding system.

7. A system in accordance with claim 6, wherein the lighting system includes a plurality of lighting units, wherein each of the plurality of modular aeroponic units are associated with one of the plurality of lighting units, and wherein each of the plurality of lighting units are controlled independently by the system controller.

8. A system in accordance with claim 7, wherein the system controller is configured to selectively control the duration and intensity of light emitted by each of the plurality of lighting units.

9. A system in accordance with claim 7, wherein the plurality of lighting units include light emitting diodes (LED).

10. A system in accordance with claim 7, further comprising one or more sensors in communication with the system controller, wherein the system controller is configured for collecting data related to system using the one or more sensors.

11. A system in accordance with claim 10, wherein the system controller includes a display for displaying the data collected from the one or more sensors.

12. A system in accordance with claim 10, wherein the one or more sensors include a light sensor, an environmental sensor, or a nutrient solution sensor.

13. A system in accordance with claim 10, further comprising a memory in communication with the system controller, wherein the data collected from the one or more sensors is stored in the memory, wherein the memory is in communication with the system controller through a network.

14. A system in accordance with claim 10, further comprising at least one remote computing device in communication with the system controller through a network, wherein the at least one remote computing device includes a software application program that is configured for displaying the data collected by the system controller, independently controlling the plurality of lighting units, and selectively allowing the fluid to flow from the pressurized reservoir to the plurality of modular aeroponic units.

15. A system in accordance with claim 1, wherein the side wall is disposed at an angle of about 101 degrees relative to the top wall.

16. A system in accordance with claim 1, further comprising a fluid return system in fluid communication with the unpressurized reservoir, wherein the bottom wall includes an outlet that is in fluid communication with the fluid return system.

17. A system in accordance with claim 1, wherein the at least one spray nozzle includes a cone angle of about 110 degrees.

18. A system in accordance with claim 1, wherein the at least one spray nozzle includes a plurality of spray nozzles, and wherein each of the plurality of spray nozzles are spaced apart about 6 inches from one another.

19. An aeroponic growth system for growing vegetation, the system comprising:
  a plurality of modular aeroponic units configured for supporting vegetation, wherein each of the plurality of modular aeroponic units define a root zone and a vegetative zone, and wherein each of the plurality of modular aeroponic units include at least one spray nozzle directed into the root zone;
  a lighting system associated with the plurality of the modular aeroponic units and configured for emitting light in the vegetative zone;
  a pressurized reservoir configured for housing a fluid containing one or more nutrients; and
  a nutrient feeding system configured for fluidly connecting each of the plurality of modular aeroponic units to the pressurized reservoir in parallel, wherein the nutrient feeding system includes a pressure stop valve associated with each of the plurality of modular aeroponic units,
  wherein when one or more of the plurality of modular aeroponic units are connected to an associated pressure stop valve, the nutrient feeding system directs the fluid to the at least one spray nozzle associated with the modular aeroponic unit from the pressurized reservoir,
  wherein when one or more of the plurality of modular aeroponic units are disconnected from the associated pressure connect valve, the pressure stop valve is configured for preventing the fluid from flowing from the pressurized reservoir through the pressure stop valve, and the other modular aeroponic units connected to the nutrient feeding system remain fluidly connected to the pressure reservoir,
  wherein each of the plurality of modular aeroponic units includes a top wall, a bottom wall, and a side wall extending between the top wall and the bottom wall, wherein the top wall, the bottom wall, and the side wall define the root zone,
  wherein a portion of the side wall is disposed at an angle of between about 95 degrees and about 105 degrees relative to the top wall, wherein the portion of the side wall provides support for the at least one spray nozzle, and
  wherein the at least one spray nozzle includes a cone angle of about 90 degrees to about 130 degrees.

20. A system in accordance with claim 18, wherein the at least one spray nozzle includes a plurality of spray nozzles, and wherein each of the plurality of spray nozzles are spaced apart about 6 inches from one another.

21. A system in accordance with claim 19, further comprising:
  an unpressurized reservoir for storing the fluid; and
  a pump that is in fluid communication between the unpressurized reservoir and the pressurized reservoir, wherein the pump is configured for drawing the fluid from the unpressurized reservoir into the pressurized reservoir and pressurizing the fluid in the pressurized reservoir.

22. A system in accordance with claim 19, further comprising a filter in fluid communication between the unpressurized reservoir and the pump.

23. A system in accordance with claim 19, wherein the lighting system includes a plurality of lighting units, wherein each of the plurality of modular aeroponic units are associated with one of the plurality of lighting units.

24. A system in accordance with claim 19, further comprising a plurality of spray valves in fluid communication between the pressurized reservoir and each of the plurality of modular aeroponic units, wherein each of the plurality of spray valves is configured for selectively allowing the fluid to flow from the pressurized reservoir to the associated modular aeroponic unit.

25. A system in accordance with claim 24, further comprising a system controller in communication with the plurality of spray valves, wherein the system controller is configured for independently adjusting the plurality of spray valves to control the amount of fluid that is provided to the associated modular aeroponic units through the nutrient feeding system.

26. A system in accordance with claim 25, wherein the lighting system includes a plurality of lighting units, wherein each of the plurality of modular aeroponic units are associated with one of the plurality of lighting units, and wherein each of the plurality of lighting units are controlled independently by the system controller.

27. A system in accordance with claim 26, wherein the system controller is configured to selectively control the duration and intensity of light emitted by each of the plurality of lighting units.

28. A system in accordance with claim 26, wherein the plurality of lighting units include light emitting diodes (LED).

29. A system in accordance with claim 26, further comprising one or more sensors in communication with the system controller, wherein the system controller is configured for collecting data related to system using the one or more sensors.

30. A system in accordance with claim 29, wherein the system controller includes a display for displaying the data collected from the one or more sensors.

31. A system in accordance with claim 29, wherein the one or more sensors include a light sensor, an environmental sensor, or a nutrient solution sensor.

32. A system in accordance with claim 29, further comprising a memory in communication with the system controller, wherein the data collected from the one or more sensors is stored in the memory, wherein the memory is in communication with the system controller through a network.

33. A system in accordance with claim 29, further comprising at least one remote computing device in communication with the system controller through a network, wherein the at least one remote computing device includes a software application program that is configured for displaying the data collected by the system controller, independently controlling the plurality of lighting units, and selectively allowing the fluid to flow from the pressurized reservoir to the plurality of modular aeroponic units.

34. A system in accordance with claim 19, wherein the side wall is disposed at an angle of about 101 degrees relative to the top wall.

35. A system in accordance with claim 19, further comprising a fluid return system in fluid communication with the unpressurized reservoir, wherein the bottom wall includes an outlet that is in fluid communication with the fluid return system.

36. A system in accordance with claim 19, wherein the at least one spray nozzle includes a cone angle of about 110 degrees.

* * * * *